United States Patent [19]

Hecker

[11] Patent Number: 5,291,544
[45] Date of Patent: Mar. 1, 1994

[54] METHOD OF TRANSFERRING, BETWEEN TWO SWITCHING EXCHANGES FOR MOBILE SERVICES, THE HANDLING OF AN ACTIVE CONNECTION WITH A MOBILE TERMINAL

[75] Inventor: Hubertus P. J. Hecker, Ak Voorburg, Netherlands

[73] Assignee: Koninklijke PTT Nederland N.V., Ac Groningen, Netherlands

[21] Appl. No.: 900,521

[22] Filed: Jun. 17, 1992

Related U.S. Application Data

[63] Continuation of Ser. No. 589,328, Sep. 27, 1990, abandoned.

[30] Foreign Application Priority Data

Oct. 3, 1989 [NL] Netherlands .................. 8902453

[51] Int. Cl.⁵ .................................... H04M 11/00
[52] U.S. Cl. ...................................... 379/60; 379/59; 455/33.2
[58] Field of Search ................... 379/59, 60, 63; 455/33.1, 33.2

[56] References Cited

U.S. PATENT DOCUMENTS 4,856,048 8/1989 Yamamoto et al. .................. 379/60

FOREIGN PATENT DOCUMENTS 0281111 9/1988 European Pat. Off. .

OTHER PUBLICATIONS

Article: Electrical Communication, "Cellular Mobile Radio as an Intelligent Network Application", Ballard et al., vol. 63, No. 4, 1989, pp. 389-399.
Article: Electrical Communication, "System 900: The ISDN Approach to Cellular Mobile Radio", Weib et al., vol. 63, No. 4, 1989, pp. 400-408.
Global Telecommunications Conference, Nov. 15-18, 1987, vol. 3, Tokyo, A. Nakajima et al.—"Enlarging Technologies . . . ".
36th IEEE Vehicular Technology Conference, May 20-22, 1986, G. D. Culp, "Cellular Intersystem Handoff:".
Proceedings of the International Switching Symposium, May, 1984, T. Goto et al., "Nation-Wide Automobile . . . ".

*Primary Examiner*—Jin F. Ng
*Assistant Examiner*—Dwayne D. Bost
*Attorney, Agent, or Firm*—Frishauf, Holtz, Goodman & Woodward

[57] ABSTRACT

When a mobile telephone being served by a cellular mobile radio domain served by a first switching exchange equipped for mobile radio communication through base stations for the respective calls moves over to another mobile radio domain similarly served by a second switching exchange, some additional connection and disconnection procedure is provided to avoid keeping the first switching exchange in the call path in order to continue the control of the call after a after a so-called handover procedure has put the mobile telephone into communication with the second switching exchange and therethrough with the first switching exchange. The additional steps involve establishing a direct connection between the second switching exchange equipped communication with mobile units and an exchange equipped for fixed point-to-point telecommunication through which the call passes. Thereafter, call control goes to the second switching exchange for mobile service, followed by disconnection of the first switching exchange from the call path, making it available for other calls.

2 Claims, 6 Drawing Sheets

METHOD OF TRANSFERRING, BETWEEN TWO SWITCHING EXCHANGES FOR MOBILE SERVICES, THE HANDLING OF AN ACTIVE CONNECTION WITH A MOBILE TERMINAL

This application is a continuation of application Ser. No. 07/589,328, filed Sep. 27, 1990, now abandoned.

BACKGROUND OF THE INVENTION

The invention relates to a method for transferring the handling of an active connection made to a mobile terminal between two switching exchanges equipped for mobile services in a telecommunication system equipped for mobile communication, comprising at least one mobile terminal associated with a mobile radio station, a plurality of base radio stations equipped for communication via a radio path with the mobile terminal and each having a working area with a limited range, at least two switching exchanges equipped for mobile services and each being able to interact with a specific group of the plurality of base radio stations, and a exchange equipped for fixed telecommunication which is able to interact with the mobile service switching exchanges in which method, to transfer the handling of an active connection made to the mobile terminal which is being handled by a first mobile service switching exchange which is connected to the exchange equipped for fixed telecommunication to a base radio station associated with the other mobile service switching exchange, a connection is made between the first mobile service switching exchange and the other mobile service switching exchange, a connection is made between the first mobile service switching exchange and the other mobile service switching exchange and a connection is made between said other mobile service switching exchange and the base radio station associated therewith, which base radio station reserves a radio channel for the mobile radio mobile terminal, after which the communication with the mobile terminal is taken over by said base radio station.

Such a method is better known under the name "handover procedure", which name will therefore be used hereinafter. A handover procedure serves to transfer the handling of an active connection made to a mobile terminal, for example a car telephone, from one mobile service switching exchange to an adjacent mobile service switching exchange, this being necessary because each of the base radio stations associated with every mobile service switching exchange, and consequently every mobile service switching exchange as well, only has a working area with a limited range. Hereinafter the term "active connection" is understood to mean the term "call" which is more usual in specialist circles, a "call" comprising the ringing, the transaction and the termination thereof, and a transaction relating either to data or to speech.

For the future pan-European digital mobile telecommunication system, the so-called GSM (Group Special Mobile), a handover procedure has already been defined. The program of said handover procedure is described in general in "Network Aspects of the RACE Mobile Telecommunications System" by M. Meijer, presented at the "Annual Conference of RACE project 1043, Cambridge, Jan. 23-25, 1989. Said handover procedure is described in a very detailed fashion in GSM report GSM 03.09, version 3.0.0, dated Feb. 15, 1988.

As will appear from what follows, in addition to a number of attractive aspects, the handover procedure proposed for GSM has the great drawback that the switching exchange via which an active connection is initiated remains included in the communication path to the mobile terminal throughout the duration of the connection, even if the mobile terminal moves to the working area of a base radio station associated with another mobile service switching exchange. The mobile service switching exchange via which the connection is initiated is understood to mean the exchange which contains the so-called call control. Said call control relates not only to the setting-up, maintenance and disconnection of a connection, but may also comprise additional services such as a waiting state for calls if the terminal rung is busy or even a ring-back service. In the handover procedure according to GSM, there is therefore the possibility that during a large part of the duration of a connection, two mobile service switching exchanges are involved in the maintenance thereof. This has the drawback that as efficient use as possible is not made of the units available in the mobile telecommunication system. This carries even more weight if account is taken of the fact that the time duration of active connections is only expected to increase in the future and consequently, so also will the duration of the simultaneous involvement of two mobile service switching exchanges in an active connection. Another drawback is that the first mobile service switching exchange involved in an active connection provides the billing during the whole time that the connection is active. As a result, it is not possible to adjust the billing if the mobile terminal moves in the meantime over a large distance to a region having a different billing rate.

SUMMARY OF THE INVENTION

The object of the invention is to provide a handover procedure which has the most important advantages of the handover procedure defined for GSM but does not have the drawback described above and in which, after the handover procedure has been completed, only a single mobile service switching exchange is therefore included in all cases in the communication path to the mobile terminal. For the sake of completeness, it is further pointed out in this connection that, although the object of the invention is to provide a method which can be advantageously used in GSM, the use does not have to be limited to GSM but is also possible in other mobile telecommunication systems.

For this purpose, the invention provides a method of the abovementioned type in which a connection is also made between the exchange equipped for fixed telecommunication and a second mobile service switching exchange, and in which, after the connection to the mobile terminal has been taken over by the base radio station associated with the second mobile service switching exchange, the entire handling of the connection is taken over by said second mobile service switching exchange and the connections between the two mobile service switching exchanges and between the first mobile service switching exchange and the exchange equipped for fixed telecommunication, are disconnected.

REFERENCES

M. Meijer, Network Aspects of the RACE Mobile Telecommunications System Annual Conference RACE 1043, Cambridge, Jan. 23-25, 1989;

GSM Rep 03.09, version 3.0.0, Feb. 15, 1988

BRIEF DESCRIPTION OF THE DRAWINGS

The invention will be illustrated in more detail by reference to the drawing in which.

DESCRIPTION OF THE ILLUSTRATED EMBODIMENTS

Figure 1:
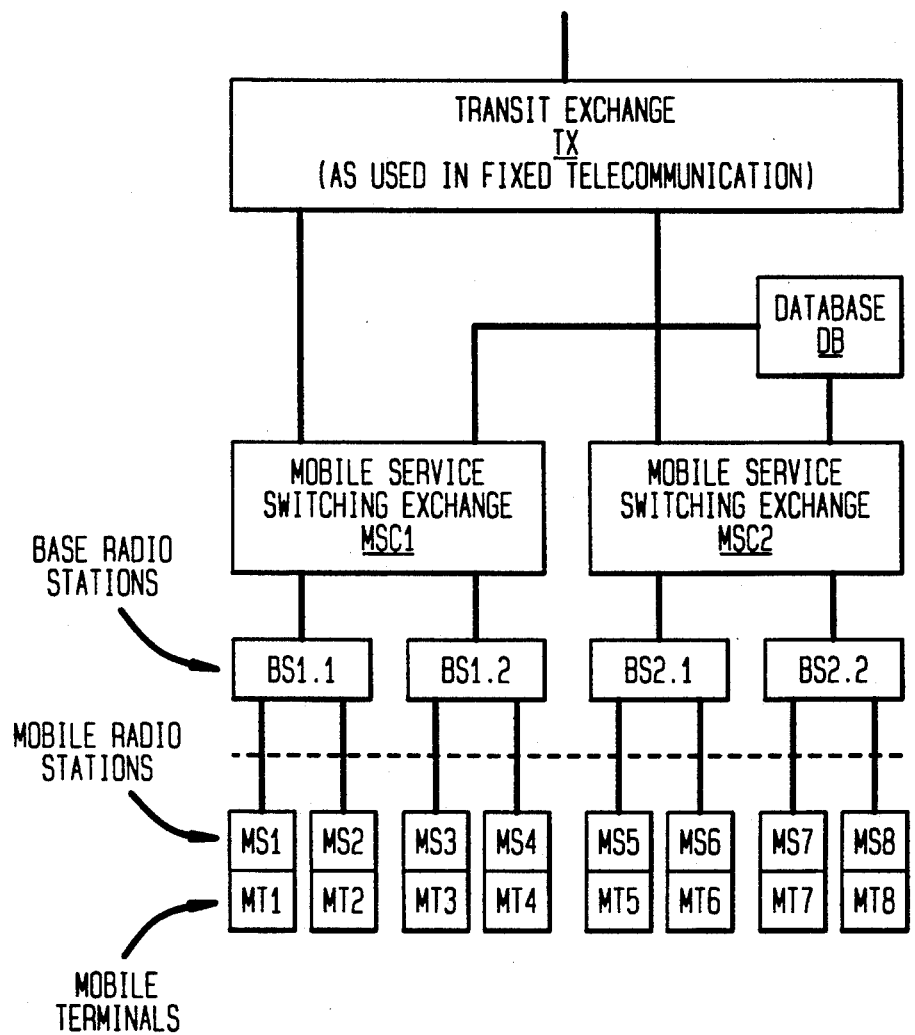
FIG. 1 shows a diagrammatic representation of the structure of a GSM network.

FIG. 1 shows diagrammatically the structure of a GSM network. Such a network is composed of a plurality of mobile radio stations (MS) with associated mobile terminals (MT), for example the telephone sets, of the mobile radio subscribers. Each mobile station can be connected via a radio path to a base radio station (BS) which is a transceiver unit having a working area with a limited range, a so-called cell. Every mobile radio station which is located inside the cell of a particular base radio station and has an active connection is in contact with said base station via a radio connection. One cell may contain a plurality of mobile radio stations having an active connection, all the said mobile radio stations therefore being connected by radio to the same base radio station. A plurality of base radio stations is associated with a mobile service switching exchange (MSC) which is a local exchange such as those also encountered in fixed telecommunication networks and which contains, inter alia, the switching functions supplemented by the specific functions which are necessary in order to be able to operate mobile telecommunication. One MSC therefore has a working area which comprises all the cells of the associated base radio stations.

A data base (DB) is connected to the mobile service switching exchanges and contains the data which relate to the mobile aspects of the GSM system. Finally, a transit exchange (TS), which is a exchange such as is also used in fixed telecommunication systems such as ISDN, is provided. Said exchange contains switching functions and the like. A plurality of MSCs is connected to one TX. The TX is connected in turn to a conventional fixed telecommunication network which is not shown.

If an MS moves from one cell, for example the working area of BS 1.2, to another cell, for example the working area of BS 2.1, said MS and its associated MT will have to be connected to the base radio station that is associated with said new cell. An existing active connection will therefore have to be rerouted to the new base radio station while the connection is active so that no interruption occurs. This rerouting is termed "handover". During handover, the situation may occur that a mobile radio station moves from the working area of one base radio station to another base radio station, for example from base radio station 1.1 to base radio station 1.2, which are both associated with the same mobile service switching exchange in this case MSC1. This situation will not be discussed in the present case in view of the fact that the GSM proposal for this type of handover already offers a satisfactory solution. The present application relates exclusively to the case where a mobile radio station moves from the cell of a base radio station associated with the first mobile service switching exchange to the cell of a base radio station associated with a second mobile service switching exchange, that is to say, for example, from BS 1.2 to BS 2.1 in FIG. 1.

The controlling functions which are important for a handover procedure are, in particular, "call control" and "handover control". In the GSM system said functions are assigned to the mobile service switching exchange which initially handles the active connection from TX to MS/MT.

Figure 2A:
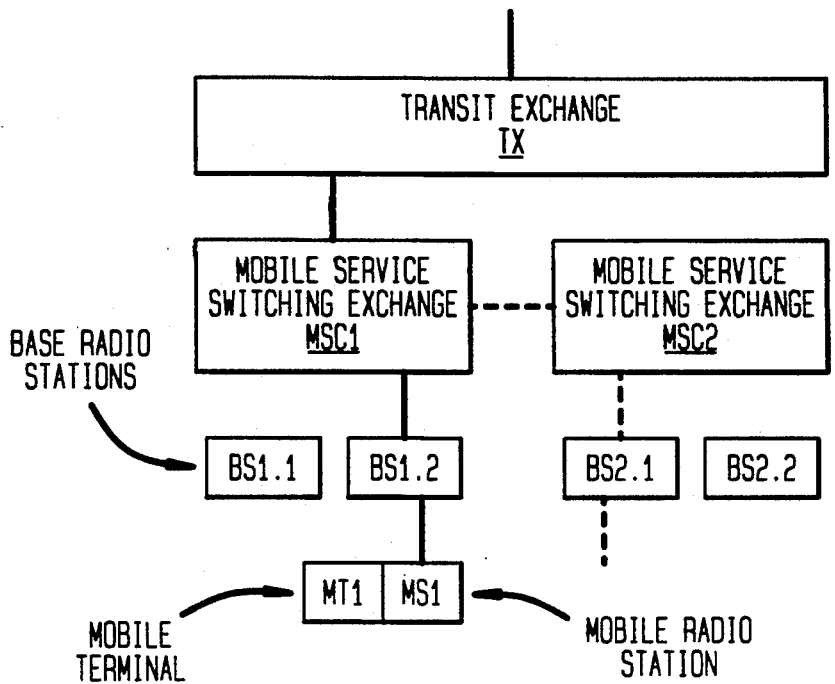
FIG. 2a–b shows a diagrammatic representation of a known handover procedure in a GSM network.

FIG. 2 shows diagrammatically the progress of the handover procedure according to the existing GSM proposal. FIG. 2a shows the initial situation in which MSC1 is the mobile service switching exchange which is originally included in the connection between TX and MS1 and therefore contains the functions "call control" and "handover control". In FIG. 2a, continuous lines indicate the functional connections between the diverse units of the GSM network in an initial situation in which MS1 is connected to TX via BS 1.2 and MSC1.

If MS1 moves from the cell of BS 1.2 to the cell of BS 2.1, a handover procedure from BS 1.2 to BS 2.1 is started. The handover procedure according to GSM proceeds in four steps.

Step 1: a request is made from MSC 1, which contains the "handover control", to MSC2 for a connection to be set up form MSC2 to MS1. For this purpose a connection from MSC2 to BS 2.1 and also a radio channel is BS 2.1 are reserved. MSC2 informs MSC1, inter alia, which radio channel has been reserved. The connections formed during step 1 are indicated by dotted lines in FIG. 2a.

Step 2: MSC1 forms a connection between MSC1 and MSC2. MSC2 couples said connection through to the connection between MSC2 and BS 2.1. Finally, MSC1 couples the connection MSC1-MSC2 to the connections TX-MSC1 and MSC1-BS 1.2 by means of a so-called bridge. The setting-up and functioning of such a bridge is known, inter alia, from the abovementioned GSM report. The functional connection formed during the second step is indicated in FIG. 2a by a chain dotted line. The diverse internal connections inside the MSCs and the base stations are not indicated for the sake of clarity.

Figure 2B:
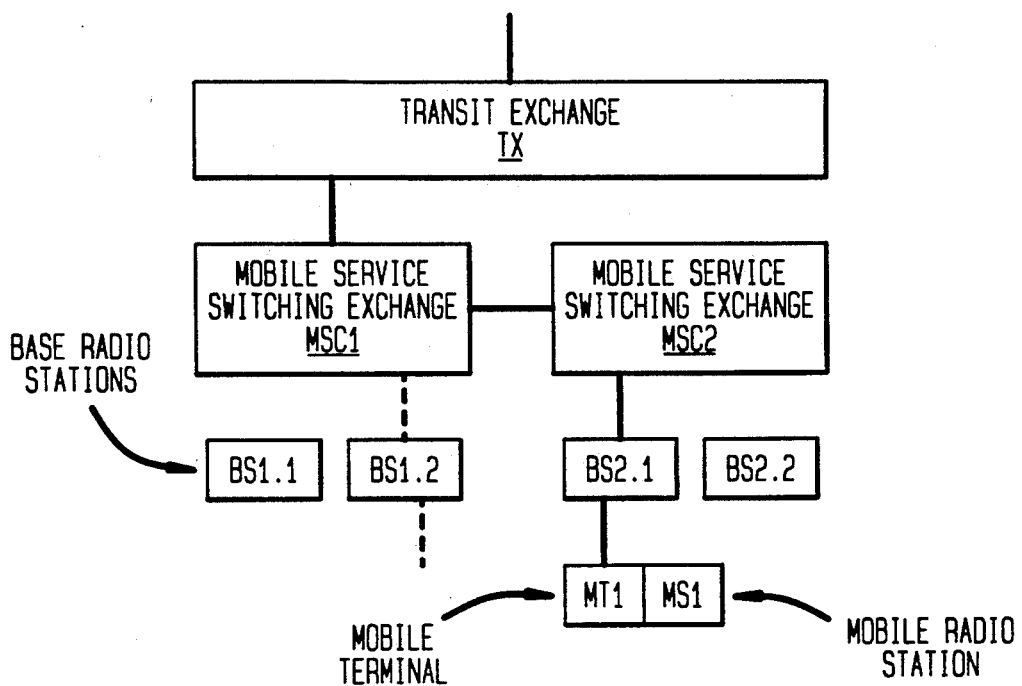

Step 3: MS1 can now switch over from the one "old" radio channel to the other "new" radio channel and therefore switches over from BS 1.2 to BS 2.1. Said switching-over is confirmed by the "handover control" of MSC1. FIG. 2b shows the situation which is obtained after the expiry of the third step.

Step 4: MSC1 clears the connection MSC1-BS 1.2 and also the radio channel of BS 1.2 and connects the connection TX-MSC1 through to the connection MSC1-MSC2. As a result, the bridge is removed from the connection of TX to MS1. During the fourth step, the communication paths shown by the dotted lines in FIG. 2b are removed. From this figure it is evident that efficient use is not made of the available connections in the handover procedure according to the GSM proposal. The most expedient would be the connection along the route MS1-BS 2.1 - MSC2 - TX, which is the shortest route from TX to MS1. In the GSM proposal, the connection between MSC1 and MSC2 is necessary because MSC1 has of necessity to be included continuously in the connection because the "call control" function and functions related thereto are included in MSC1.

If MS1 moves again, this may be to a base radio station associated with the same mobile service switching exchange with which the base station to which MS1 is currently connected is associated or to a base radio station that is again associated with MSC1 or even to a base radio station which is associated with a third mobile service switching exchange MSC3. In the case where MS1 moves to a base radio station associated with MSC1, a handover procedure is again gone through which is in fact the inverse of the procedure described above and in which, if MS1 moves to the cell of BS 1.2, the connection ultimately extends via the route MS1 -BS 1.2-MSC1-TX. After said handover procedure, MS1 is therefore again connected to TX via the shortest route. If MS1 moves to a base radio station BS 3.1 associated with MSC3, this is communicated to MSC1 which contains all the control related to the connection and MSC1 will request MSC3 to set up a connection to BS 3.1 and BS 3.1 will reserve a radio channel, this therefore being identical to the step 1 described above.

MSC1 then sets up a connection to MSC3, whereupon MSC3 connects said connection through to the connection MSC3-BS 3.1, MSC1 installs a bridge with which the connections TX-MSC1 and MSC1-MSC2, and also MSC1-MSC3, are coupled to one another. MS1 then switches over radio channel and is consequently connected to BS 3.1. Finally, MSC1 clears the connection MSC1-MSC2 and couples the connections TX-MSC1 and MSC1-MSC3 through, as a result of which the bridge is removed. The connection MSC2-BS 2.1 and the radio channel of BS 2.1 are also cleared. MSC1 is now included again in the route from TX to MS1, so that the shortest route from TX to MS1 is again not achieved in this case either.

The handover procedure according to GSM has the advantage that the fixed section of the telecommunication system, that is to say the section "above" the MSCs from the transit exchange and further into the network does not in any way notice that mobile telecommunication is involved in the lowermost section of the network, between the mobile radio stations, the base radio stations and the mobile service switching exchanges. The disadvantage of the procedure is, however, that the mobile service switching exchange, via which the connection was initially set up is active throughout the duration of the connection, so that the handover to an adjacent MSC results in an additional connection.

The invention provides a new handover procedure in which, after the expiry of the handover, the shortest route is maintained from the TX to the mobile radio station and its associated mobile terminal, so that the diverse components associated with the network, in particular the MSCs, are used more efficiently. The handover procedure according to the invention is composed of two phases, the first phase corresponding virtually completely to the handover procedure according to GSM described above and the second phase resulting in the restoration of the shortest route between TX and MS1.

As will emerge below, in the handover procedure according to the invention, the transfer of the "call control" function from one MSC to the other is also necessary. For this purpose, a new handover control unit (HCU) which deals with the totality of control related to the handover and the signalling associated therewith is introduced into the GSM network. Said HCU is not a physical unit but a functional unit which may be present, for example, in every MSC.

Figure 3A:
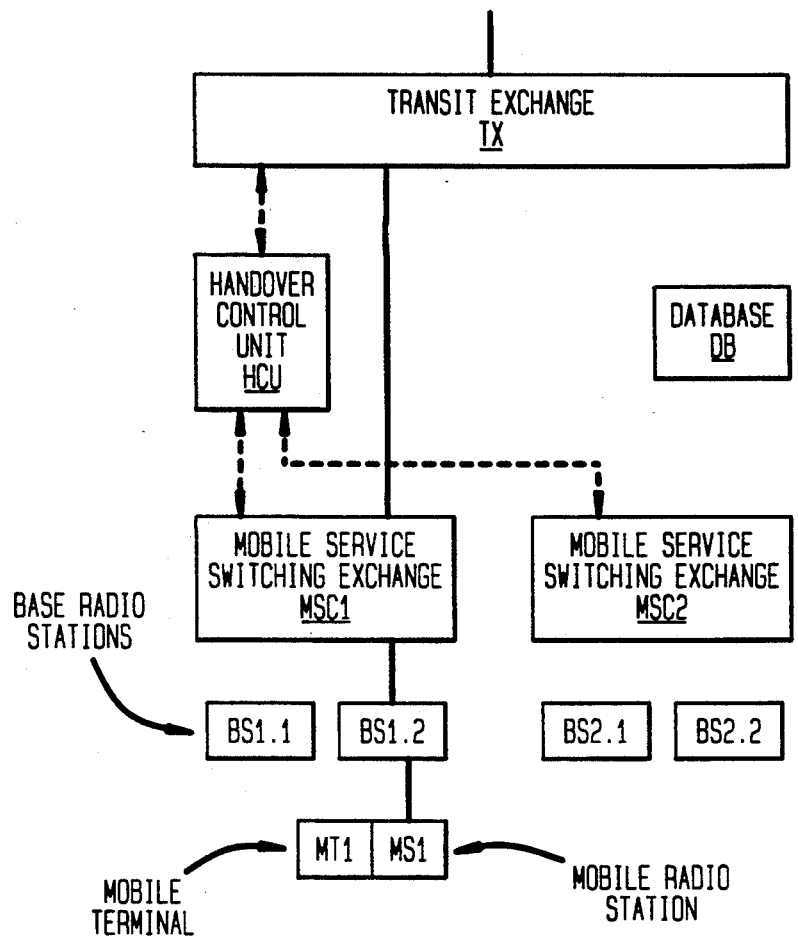
FIG. 3a–d shows a diagrammatic representation of the handover procedure according to the invention.
Figure 3B:
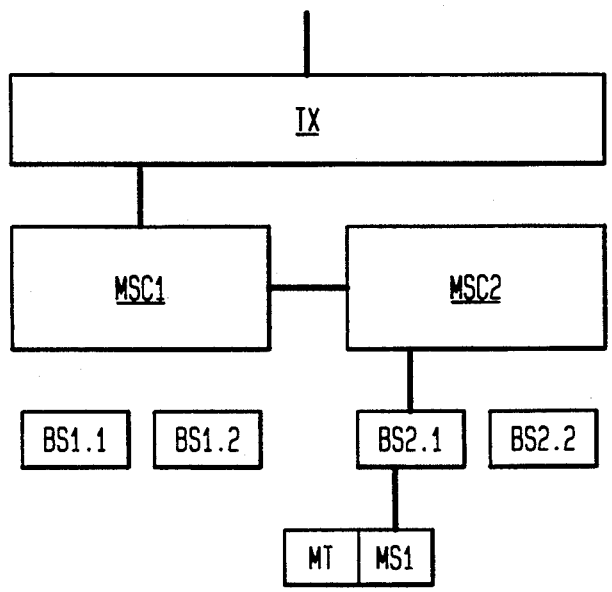

FIG. 3a shows diagrammatically the GSM network at the beginning of a handover procedure according to the invention. The handover control unit HCU has a signalling connection to the TX and to the mobile switching exchanges MSC1 and MSC2. For the sake of simplicity, the database DB which is in fact necessary is not shown in FIG. 3, while the HCU is not shown either in FIG. 3b–d. If MS1 moves from the cell associated with BS 1.2 to the cell of BS 2.1, the handover procedure initially proceeds in a manner comparable with the steps 1 to 4 inclusive which have been illustrated above with reference to FIG. 2a, b. After the expiry of step 4, the diverse connections shown in FIG. 3b are achieved. Up to and including said 4th step it does not matter whether the handover control unit HCU is imagined to form part of MSC1 or is seen as a separate unit. The only difference from the handover procedure described above is that a call control function is reserved in MSC2 during the second step. Said function is synchronised with the call control function of MSC1. From the instant that this synchronisation has been achieved, both call control functions continue to be active, the call control in MSC1 having a "master" function and therefore actually taking the decisions, while the call control in MSC2 has a "slave" function and therefore has no authority to take decisions.

Figure 3C:
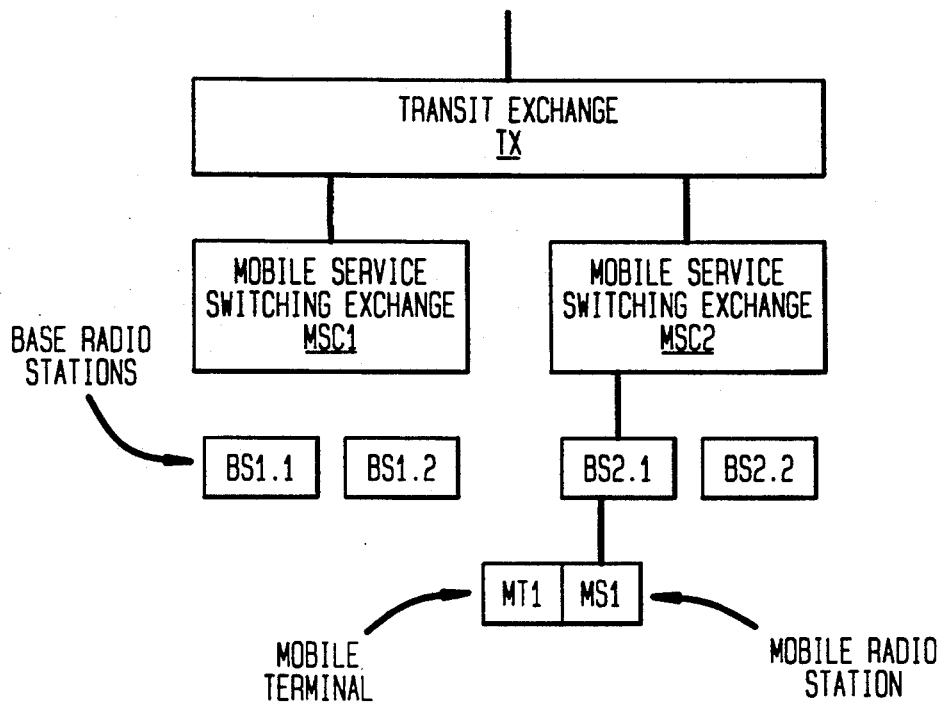

After the situation shown in FIG. 3b has been reached, the handover procedure according to the invention proceeds as follows:

Step 5: the HCU signals that a connection has to be set up between MSC2 and TX, for which purpose a bridge which couples the connections TX-MSC2 and MSC2-MSC1 and also MSC2-BS 2.1 to one another is installed in MSC2. The connection between TX and MSC2 is related by the TX to the active connection which already exists. The situation now obtained is shown in FIG. 3c.

Step 6: the TX can now switch over from the connection TX-MSC1 to TX-MSC2.

Step 7: HCU signals that the call control in MSC2 has to take over the actual call control of the call control in MSC1 and from now on, the connection is therefore controlled by the MSC2 call control, to which the MSC1 call control is no longer relevant.

Figure 3D:
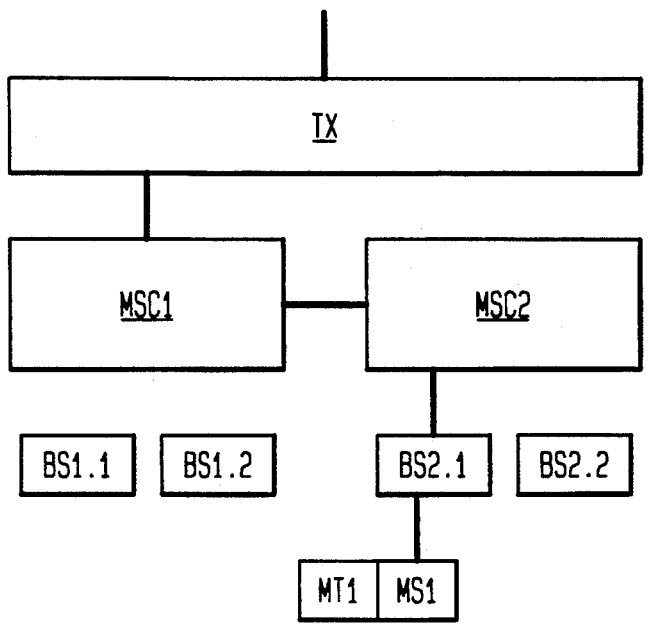

Step 8: finally, the call control function in MSC1 and also the connections TX-MSC1 and MSC1-MSC2 will be cleared. The bridge which was present until then in MSC2 is removed and the connections TX-MSC2 and MSC2-BS 2.1 will be connected through. The situation then obtained is shown in FIG. 3d. It is evident from this figure that, owing to the handover procedure according to the invention, the shortest route is again achieved between TX and MS1 after the expiry of said procedure.

Figure 4:
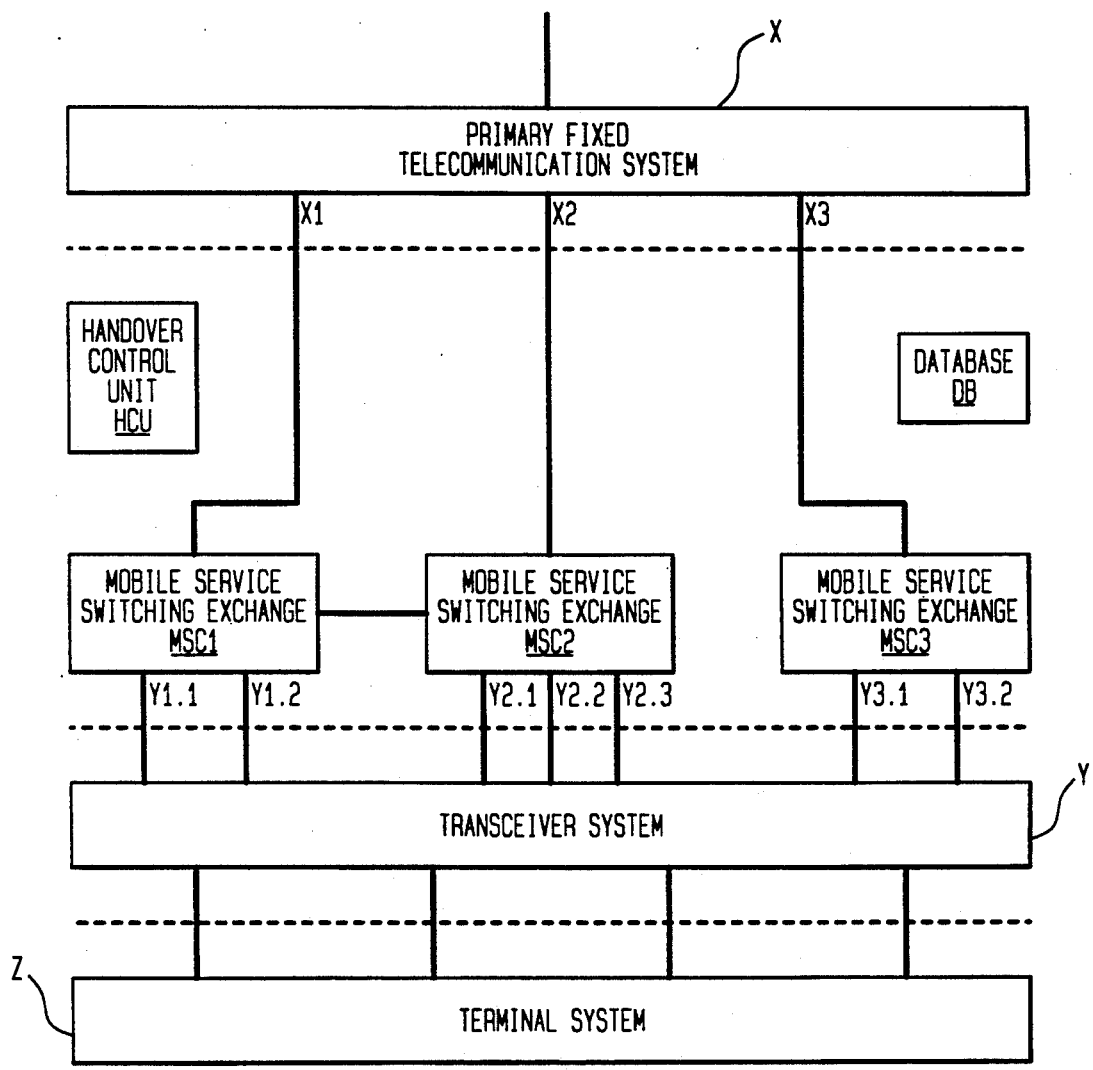
FIG. 4 shows a very general diagrammatic representation of a mobile telecommunication system.

FIG. 4 shows a very diagrammatic representation of a mobile telecommunication system in which the block X represents a primary fixed telecommunication system, for example an ISDN network, having connections X1 to X3 inclusive. The fixed telecommunication system is connected via said connections to mobile service switching exchanges MSC1 to MS3 inclusive, each having a plurality of outputs Y. An HCU and a DB which have the same function as described above are furthermore provided. The MSCs are connected via the Y connections to the transceiver system Y which is connected via a radio route tot he terminal system Z. Referring to FIG. 4, the handover procedure according to the invention can be described functionally as follows, it being assumed that, for an existing active connection, the configuration of the connections extends from Xi via Yi.k ultimately to a mobile radio station in the system Z. If it is further assumed that the handover takes place from connection Yi.k to Yj.1, where i n j, the handover procedure results in Step 1: setting up of the connection MSCi/MSCj.

Step 2: setting up of the connection Yj.1 to, ultimately, MS.

Step 3: setting up of the connection Xj between the primary telecommunication system and MSCj.

Step 4: switching over of connection Yi.k to YJ.1 by, ultimately, the MS.

Step 5: switching over of the primary telecommunication system from connection Xi to Xj.

Step 6: installation of a "bridge" between the connections Xi, Yi.k and MSCi/MSCj in MSCi.

Step 7: connecting through of the connections Xi and MSCi/MSCj in MSCi, the "bridge" thereby being removed.

Step 8: installation of a "bridge" between the connections Xj, Yj.1 and MSCi/MSCj in MSCj.

Step 9: connecting through of the connections Xj and Yj.1 in MSCj, the "bridge" thereby being removed.

Step 10: reserving of slave "call control" in MSCj in parallel with the master "call control" in MSCi.

Step 11: synchronising of slave "call control" in MSCj with master MSCi "call control".

Step 12: clearing of connection Xi.

Step 13: clearing of connection MSCi/MSCj.

Step 14: connecting through of the connections MSCi/MSCj and Yj.1 in MSCj.

Step 15: transferring of call control from MSCi to MSCj.

Step 16: clearing of call control in MSCi. These steps can be gone through in an arbitrary sequence provided the following rules are fulfilled:

Step 1 is carried out before step 6;
Step 1 is carried out before step 8;
Step 2 is carried out before step 8;
Step 3 is carried out before step 8;
Step 1 is carried out before step 14;
Step 2 is carried out before step 14;
Step 6 is carried out before step 4;
Step 8 is carried out before step 5;
Step 4 is carried out before step 7;
Step 5 is carried out before step 9;
Step 5 is carried out before step 12;
Step 5 is carried out before step 13;
Step 10 is carried out before step 11;
Step 11 is carried out before step 15;
Step 15 is carried out before step 16;
End of handover takes place after all the steps have been carried out.

It is pointed out that if step 8 takes place earlier than step 4, step 14 does not need to be carried out.

Figure 5:
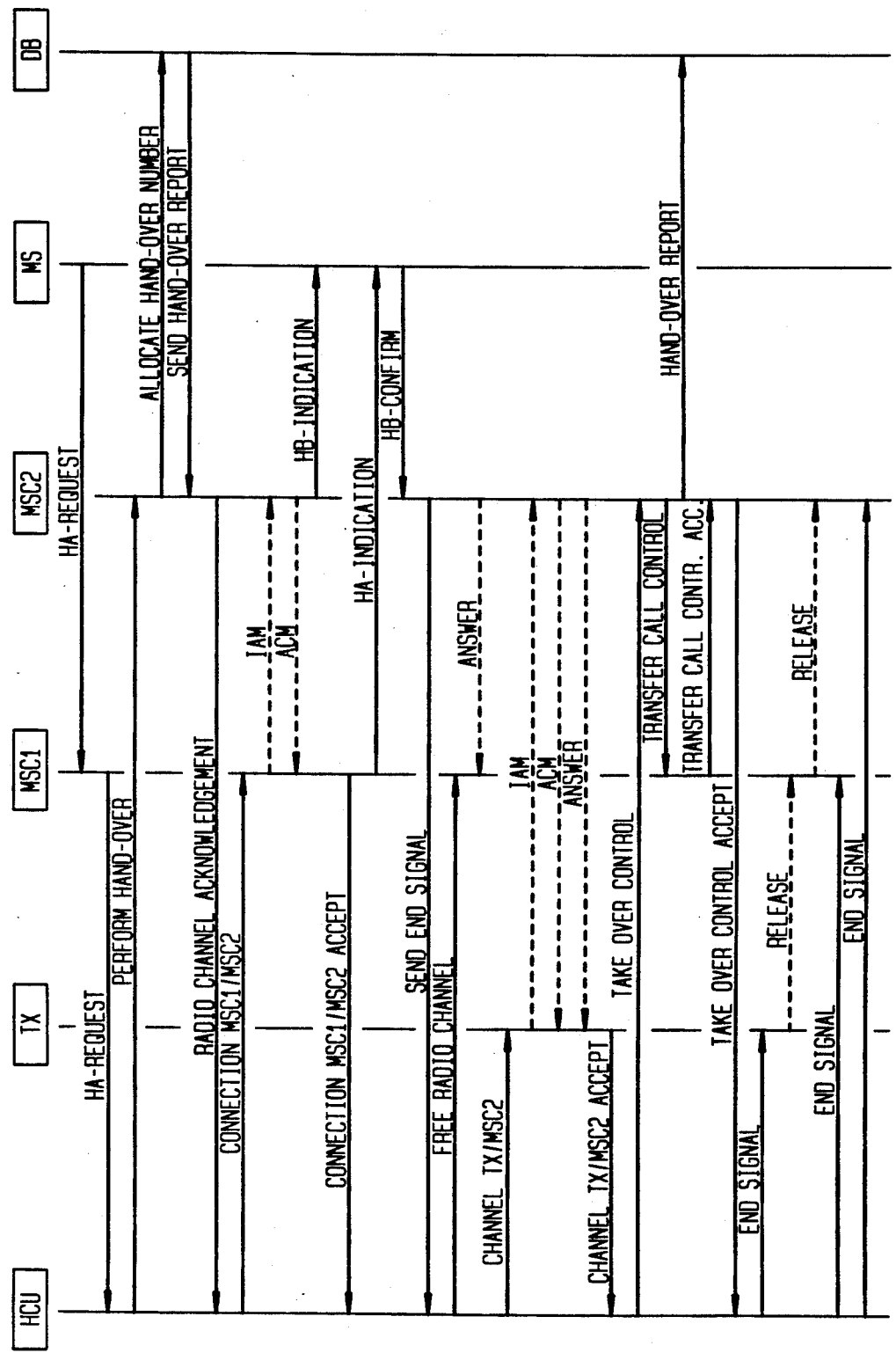
FIG. 5 shows a flow diagram of the method according to the invention.

FIG. 5 shows a possible flow diagram of the handover procedure according to the invention. In this it is assumed that the signalling system no. 7 (SS no. 7) is used for signalling between the exchanges. This is an internationally standardised signalling system which has been optimised for use in digital telecommunication systems together with exchanges which are controlled by processors, which also fulfills the present and future requirements for the exchange of information for transactions between exchanges in telecommunication networks such as call control, management and maintenance and which, finally, caters for a reliable transfer, in the correct sequence, of the information to be exchanged without loss or duplication of the information occurring. As a service for lower levels (the so-called Lower Level Service) use is also made inside SS no. 7 of the so-called "transaction capabilities application part" (TCAP) which has the object of enabling the exchange of information between network nodes and which offers services for particular applications without being dependent thereon. In an SS no. 7 network, TCAP is used mutually between network nodes, for example exchanges between exchanges and, for example, databases and specific units and between network service exchanges.

In FIG. 5, signals from and to a so-called interworking entity are indicated by an (X) and reports which are associated with the peer-to-peer protocol between the various entities are written in lower case letters. Handover takes place when the identity of the BS to which routing has to take place has been determined.

After the HCU has received the "ha-request" message, it sends a "perform handover" message to MSC2. This message contains all the parameters which MSC2 needs in order to cause a radio channel to be allocated by the BS to which routing has to take place, and also the identity of the BS.

MSC2 calls up a so-called handover number from the database by means of exchanging the messages "allocate handover number" and "send handover report". Said number is used for routing the call from MSC1 to MSC2. If a radio channel is available in MSC2, a "radio channel acknowledgement" message is sent from MSC2 to HCU which contains the identity of the new radio channel and the handover number.

If no radio channel is available in MSC2, this is reported to the HCU which will then terminate the handover procedure. The existing connection to the MS is not cleared.

When the "radio channel acknowledgement" message is received, the HCU sends a "connection MSC1/MSC2" message to MSC1, which message contains the identity of the radio channel and the handover number. Making use of the handover number for routing, the MSC1 then sets up a connection from MSC1 to MSC2, which is represented by the exchange of the "IAM" and "ACM" messages of the signalling system SS no. 7. MSC2 initiates the handover procedure on the radio path when the "ACM" has been sent, this being represented by "HB-INDICATION". After receiving "ACM", MSC1 informs the HCU that the connection to MSC2 has been set up, which is represented by the "connection MSC1/MSC2 accept"message.

MSC1 then "couples" the connections between the TX and MSC1, the MSC1 and MSC2, and MSC1 and the associated BS to one another by means of a so-called "bridge". MSC1 then initiates the handover procedure on the MSC1 side, this being represented by the "HA-INDICATION" message. After the MS has been successfully switched over from the "old" BS to the "new" BS, MSC2 sends an indication of this to HCU by means of the "send end signal" message. The HCU then sends a "free radio channel" message to the MSC1.

MSC1 then connects the connections between the TX and MSC1 and between the MSC1 and MSC2, the "bridge" therefore being removed, and clears the old radio channel. A confirmation of the through connection and the clearing is sent to the HCU by MSC1 by means of the "free radio channel accept" message.

In order not to arrive at a conflict situation with the protocol of the SS no. 7 used, MSC2 has to generate an answer signal, the "ANSWER" message, when the "HB-CONFIRM" message has been received.

If the connection between MSC1 and MSC2 cannot be set up, which will be indicated in a message other than the "ACM" message, this is transmitted to the HCU which then terminates the handover procedure.

The HCU sends a "channel TX/MSC2" message to the TX. The TX then prepares to set up a connection from the TX to MSC2, which is illustrated by the "IAM" message. After MSC2 has received said "IAM" message, its sends an "ACM" back and "couples" the connection set up with the TX to the connections between MSC1 and MSC2 and the connection between the MSC2 and the "new" BS. This is done by means of a "bridge". An "ANSWER" message is then set to the TX. After the "ANSWER" message has been received, the TX switches from the connection which runs from the TX to the MSC1 to the connection which runs from the TX to MSC2. After this switch-over, an indication thereof is sent to the HCU, which is illustrated by the "channel TX/MSC2 accept" message.

In order to stop the procedures related to handover, the HCU sends "end signal" reports both to the TX, MSC1 and MSC2. The TX then clears the connection between the TX and MSC1 by despatching a "RELEASE" message. MSC1 will then clear the connection between MSC1 and MSC2, whereupon MSC2 removes the "bridge" and will connect through the connection between TX and MSC2 and the connection between MSC2 and the BS.

As shown in the flow diagram of FIG. 5, the handover procedure also contains the transfer of call control from MSC1 to MSC2. In the handover flow diagram the following is therefore assumed:

if MSC1 sets up a connection between MSC1 and MSC2 by transmitting the "IAM" message, the present state which the call control function is in is sent concomitantly. MSC2 will then reserve a call control function and synchronise. From this instant onwards there are therefore two call control functions, one in MSC1 and one in MSC2, which are in parallel. However, the call control function of MSC1 retains the actual control and can be seen as the "master", while the call control function of MSC2 is the "slave";

all the messages which are related to call control and are received by MSC1 from the TX before the latter has switched over from the connection between the Tx and MSC1 to the connection between the TX and MSC2 and from the "old" BS, as well as all the actions which are possibly undertaken by the call control function are transmitted to MSC2, so that the "slave" control function is able to remain synchronous;

all the messages which are related to call control and are received by MSC1 from the TX after the latter has switched over from the connection between the TX and MSC1 to the connection between the TX and MSC2 and from the "new" BS are transmitted to MSC1 which consequently continues to receive all the call control messages and is able to remain the "master". In this state, it holds true that the call control function contained in MSC1 is totally dependent on the transmission of the call control messages by MSC2.

HCU will ultimately initiate the actual transfer of call control by despatching the "take over control" message to MSC2. MSC2 will then take over the call control. MSC2 will no longer transmit any call control messages to MSC1 but, on the contrary, will transmit a "transfer call control" message to MSC1. MSC1 then clears its call control function and sends a confirmation of this to MSC2 by means of the "transfer call control accept" message.

After the actual takeover of call control, MSC2 sends a "handover report" message to the database DB in order to update the present location of the MS if appropriate. MSC2 finally reports the call control takeover to the HCU by means of the "take over control accept" message.

I claim:

1. In a telecommunication system equipped for mobile communication and comprising at least first and second mobile service switching exchanges, wherein said first mobile service switching exchange is connected, for an active connection form a mobile terminal to a first terminal via an exchange (TX), external to said system and equipped only for fixed location telecommunication, by a first interexchange connection, said telecommunication system equipped for mobile communication further comprising a plurality of mobile radio stations (MS), every said mobile radio station being exclusively associated with a mobile terminal, a plurality of base radio stations (BS) equipped for communicating via a radio path and a said mobile radio station with a said mobile terminal associated with said last-mentioned mobile radio station, each base radio station (BS) having a working area with a limited range, and said at least first and second mobile service switching exchanges each being able to interact with a specific group assigned to it of the plurality of base radio stations, said exchange (TX) equipped only for fixed location telecommunication being able to interact with said mobile service switching exchanges of said system, a method of transferring in said telecommunication system the handling of said active connection between said first terminal and said first-mentioned mobile terminal by transferring said handling from said first mobile service switching exchange and a first base radio station assigned thereto over to said second mobile service switching exchange and a second base radio station assigned thereto, said method comprising the following steps:

making, for said active connection, a second interexchange connection between said first mobile service switching exchange (MSC1) and said second mobile service switching exchange (MSC2);

making, for said active connection, an auxiliary connection between said second mobile service switching exchange (MSC2) and said second base radio station and requesting of said second base radio station the reservation of a radio channel thereof for said active connection;

reserving at said second base radio station a radio channel for the mobile radio station associated with said first-mentioned mobile terminal;

making a third interexchange connection between said exchange (TX) equipped only for fixed location telecommunication and said second mobile service switching exchange (MSC2);

thereafter routing said active connection through said second interexchange connection and said auxiliary connection while communication with said mobile radio station associated with said first-mentioned mobile terminal proceeds via said radio channel reserved by said second base radio station, whereby said second base station takes over from said first base radio station radio communication with said mobile radio station;

after said second radio base station takes over radio communication with said mobile radio station, preparing a takeover by said second mobile service switching station of the entire handling of said active connection; and thereafter disconnecting said second and said first interexchange connections, thereby leaving with said second switching station the entire handling of said active connection.

2. Method according to claim 1, characterized in that, after said second interexchange connection has been made between said first and second mobile service switching exchanges, the handling of the active connection in both said switching exchanges runs synchronously, the first mobile service switching exchange having the authority to make decisions until the second mobile service switching exchange takes over the entire handling.

* * * * *